Figure 1:
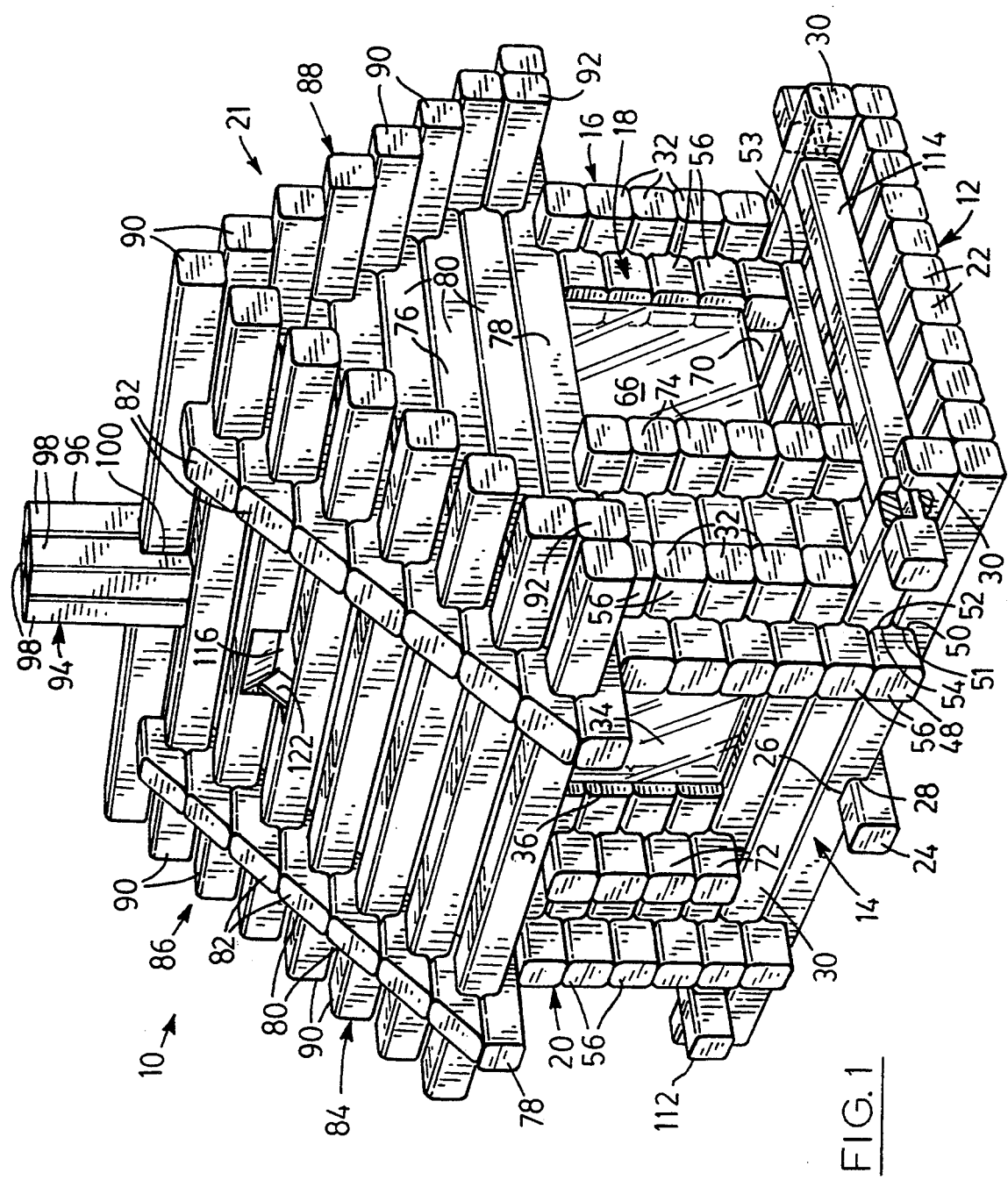

United States Patent [19]

Wawzonek

[11] Patent Number: 5,354,223

[45] Date of Patent: Oct. 11, 1994

[54] MINIATURE BUILDING

[76] Inventor: Stanley Wawzonek, R.R. #1, Jerseyville, Ontario, Canada, L0R 1R0

[21] Appl. No.: 160,625

[22] Filed: Dec. 2, 1993

[51] Int. Cl.⁵ .................... A63H 33/08; A01K 31/00; A01K 1/10; A47G 29/00

[52] U.S. Cl. .................................. 446/106; 119/23; 119/52.1; 248/125

[58] Field of Search ............... 446/106, 85; 119/23, 119/52.1, 52.2, 54, 57.8; 273/160; 211/4; 248/125, 407

[56] References Cited

U.S. PATENT DOCUMENTS

| | | | |
|---|---|---|---|
| 642,011 | 1/1900 | Sill | 211/4 X |
| 1,710,947 | 4/1929 | Payne | 119/23 |
| 1,916,878 | 7/1933 | Anklam | 119/23 |
| 2,125,580 | 8/1938 | Paulson | 446/106 X |
| 2,349,868 | 5/1944 | Hyde | 119/57.8 |
| 2,669,060 | 2/1954 | Kalvig | 446/127 X |
| 2,680,327 | 6/1954 | Harper | 446/85 X |
| 3,295,498 | 1/1967 | Brown | 119/23 |
| 3,792,685 | 2/1974 | Wiener | 119/23 |
| 4,270,304 | 6/1981 | Sofer | 446/106 |
| 4,372,076 | 2/1983 | Beck | 446/106 |

Primary Examiner—Robert A. Hafer
Assistant Examiner—D. Neal Muir
Attorney, Agent, or Firm—Rogers & Scott

[57] ABSTRACT

A miniature building has walls surrounding an area and forming corners where pairs of adjacent walls meet. Each wall is formed by a series of horizontal elongated wall members stacked one upon the other, the wall members of each wall being interlocked with adjacent wall members of an adjacent wall at each corner formed by a pair of adjacent walls. A pair of opposed walls has upper portions extending above at least one other wall, and a roof is mounted on the upper portions of the pair of opposed walls. The roof is formed by a series of horizontal elongated roof members located one above the other in stepped formation, the wall members of the upper wall portions being interlocked with the elongated roof members. The building also has at least one retaining assembly retaining the elongated members of the roof and walls in position. Each retaining assembly has a shaft member passing through apertures in respective elongated members and having opposite ends protruding therefrom, and a retainer at each protruding end of the shaft member, the retainers retaining the elongated members of the roof and walls in position.

4 Claims, 4 Drawing Sheets

MINIATURE BUILDING

This invention relates to miniature buildings of the kind which may have variety of uses such as bird feeders, bird houses and children's toys.

Various miniature buildings of this kind are of course known but there is still a need in the market place for a miniature building which has a log cabin-like appearance, which can be assembled from a substantially small number of preformed components and which is of reasonable cost.

According to the invention, a miniature building has walls surrounding an area and forming corners where pairs of adjacent wall meet. Each wall comprises a series of horizontal elongated wall members stacked one upon another, the wall members of one wall being interlocked with adjacent wall members of an adjacent wall at each corner formed by a pair of adjacent walls. A pair of opposed walls has upper potions extending above at least one other wall. The building also has a roof mounted on the upper potions of the pair of opposed walls, the roof comprising a series of horizontal elongated roof members located one above the other in stepped formation, the wall members of the upper wall potions being interlocked with the elongated roof members. At least one retaining assembly retains the elongated members of the roof and walls in position, the or each retaining assembly comprising a shaft member passing through apertures in respective elongated members and having opposite ends protruding therefrom, and a retainer at each protruding end of the shaft member, said retainers retaining the elongated members of the roof and wall in position.

The miniature building may also include a floor on which the walls are mounted, the floor comprising a series of horizontal side-by-side elongated floor members.

The upper wall portions may extend above a further pair of opposed walls, with the roof comprising a first roof portion with elongated roof members in stepped formation extending upwardly from one of the further opposed walls and a second roof portion with elongated roof members in stepped formation extending upwardly from the other of the further opposed walls, the roof portions meeting at an apex.

A single retaining assembly may be provided, the retaining assembly comprising a shaft member extending from the apex of the roof centrally through the building through the floor, the shaft member protruding from the roof, a first elongated retainer member passing through an upper aperture in the shaft member to serve as an upper retainer member and a second elongated retaining member extending transversely of and below the elongated floor members and passing through a lower aperture in the shaft member to serve as a lower retaining member.

The elongated floor members and the elongated roof members may extend parallel to each other beyond the opposed walls for at least one-sixth of their length at each end.

The elongated wall members and the elongated roof members may have downwardly and upwardly open recesses to enable adjacent wall members or wall members and roof members to be interlocked with each other.

Figure 2:
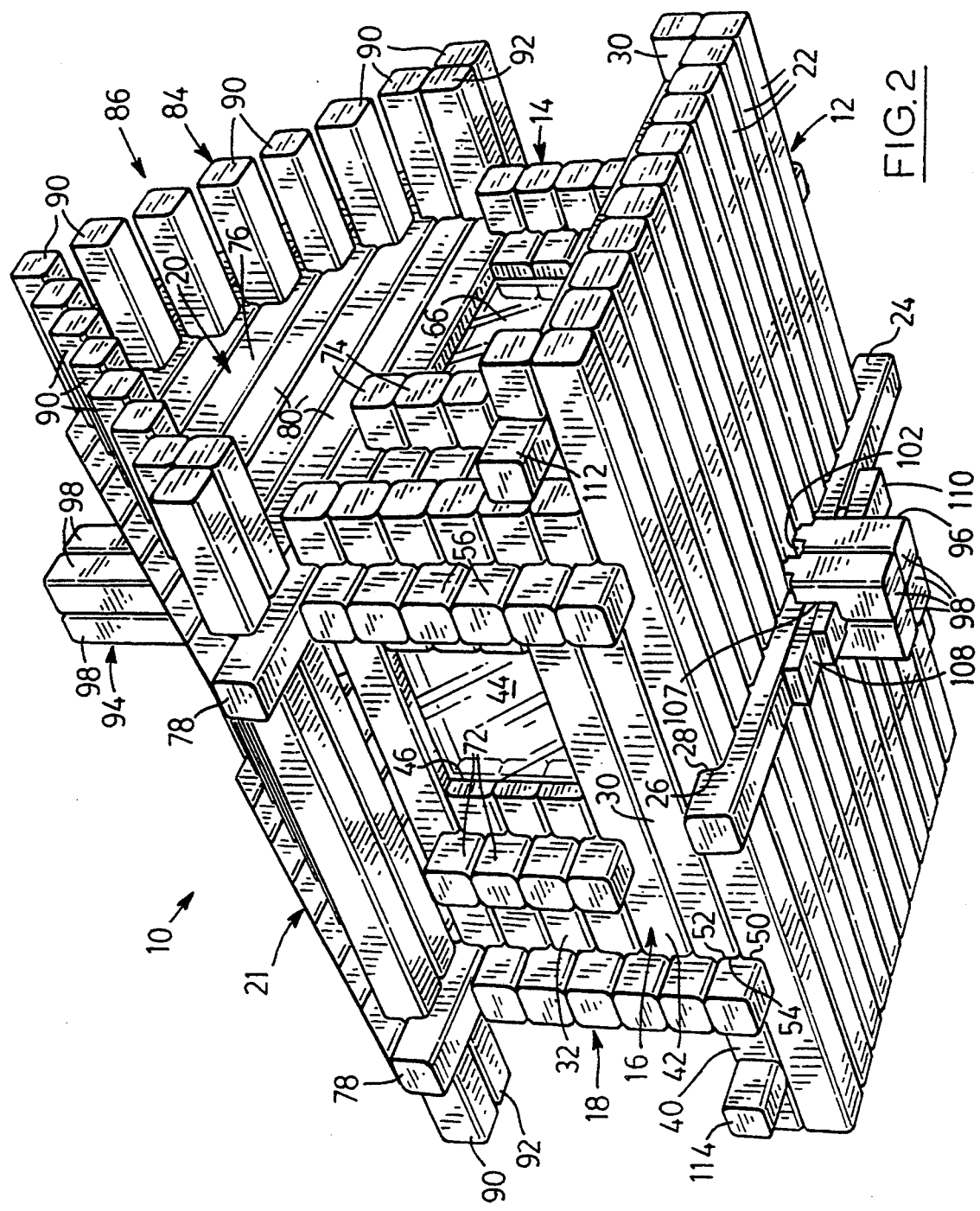
Figure 3:
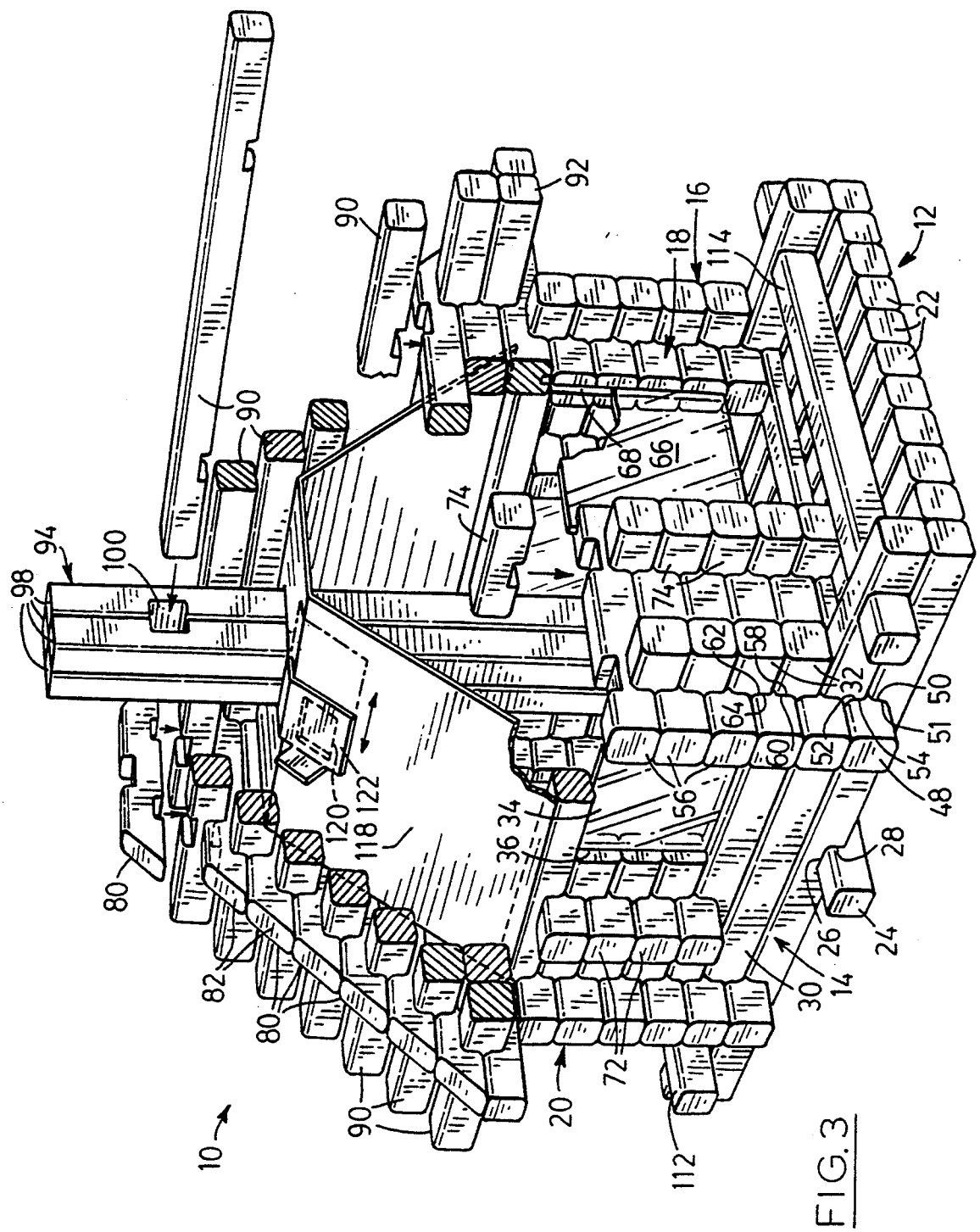
Figures 4, 5:
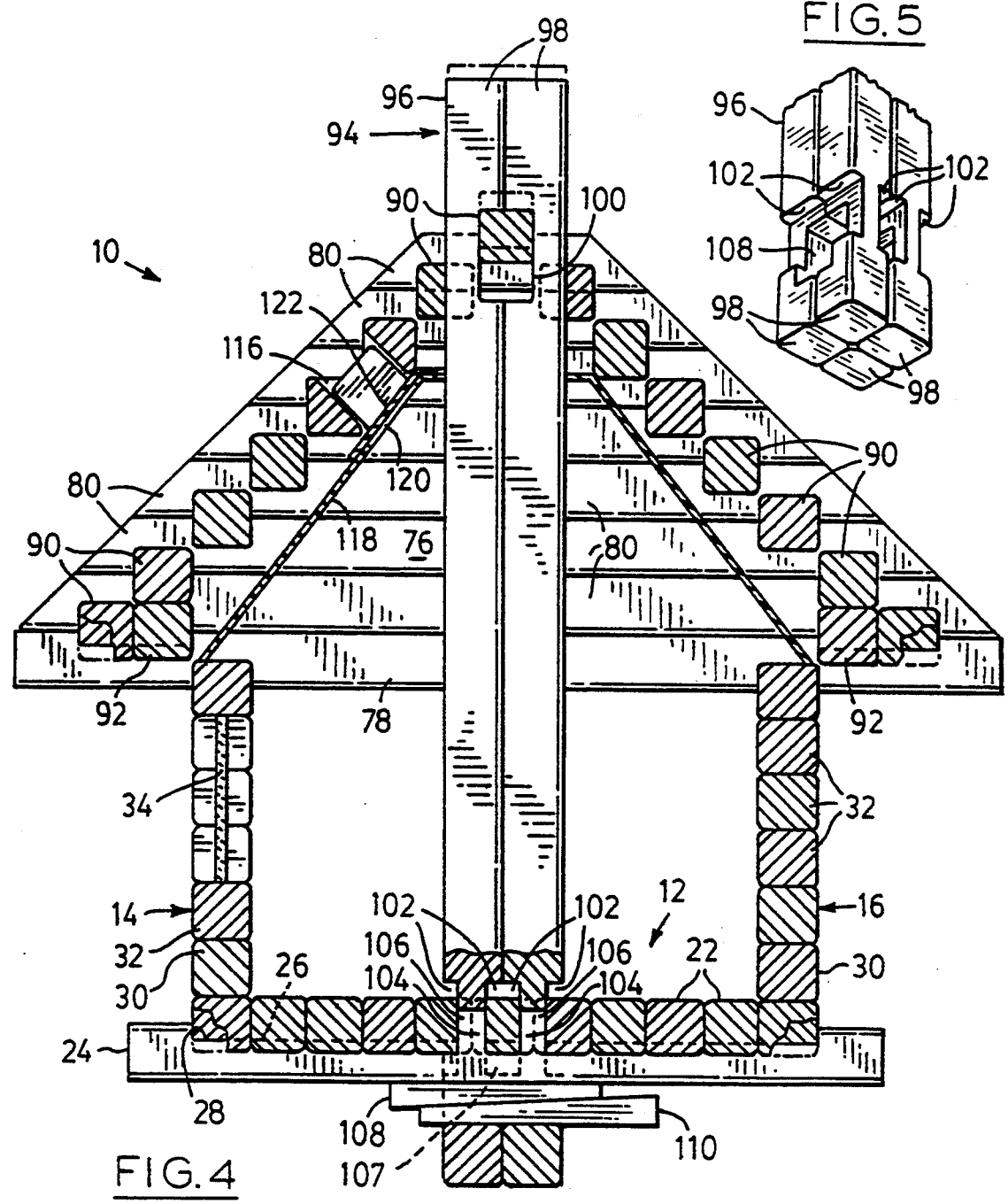

One embodiment of the invention will now be described, by way of example, with reference to the accompanying drawings, of which:

FIG. 1 is a perspective view from the front and one side and from slightly above a bird feeder in accordance with one embodiment of the invention, FIG. 2 is a similar view but from the rear and other side and from slightly below the bird feeder, FIG. 3 is a perspective view, partly broken away and partly in exploded form, showing constructional details of the bird feeder, FIG. 4 is vertical sectional view showing how various components of the bird feeder are held in the assembled condition, with some parts being omitted for clarity, and FIG. 5 is a perspective view of a lower portion of the retainer shaft member of the bird feeder.

Referring to the drawings, a miniature building in the form of a bird feeder 10 has a floor supporting four walls surrounding a rectangular area, namely a front wall 14, a rear wall 16 and side walls 18, 20, and a roof 21 supported by the four walls.

The floor 12 comprises a series of side-by-side elongated floor members 22 of square cross-section. As will be described in more detail later, the floor members 22 are supported by an elongated floor supporting retainer member 24 of square cross-section extending beneath the middle of and transversely to the floor members 22.

The floor support member 24 has a longitudinally extending recess 26 in its upper surface, and each floor member 22 has a recess 28 at a central position in its lower surface. Each floor member 22 is interlocked with the floor support member 24 by causing the bottom of the recess 28 in the floor member 22 to engage the bottom of the recess 26 in the floor support member 24, with the floor member 22 being a close fit in the recess 28 and with the floor support member 24 being a close fit in the recess 26, thereby providing close fitting interlocking engagement. The length of the recess 26 in the floor support member 24 is approximately equal to the combined width of the floor members 22 so that the floor members 22 are held in close fitting side-by side relationship by the ends of the recess 26.

The four walls 14,16,18,20 are supported by the floor 12. The front wall 14 comprises a lowermost horizontal elongated wall member 30 of square cross-section which is located above and is of the same length and cross-section as the front floor member 22. The front wall 14 also comprises five shorter elongated wall members 32 of the same cross-section as before stacked one upon the other and extending over the medial portion of the lowermost wall member 30. The second, third and fourth wall members 32 each have portions removed to provide a rectangular window opening in which a window 34 is located. The window 34 rests on the lowermost wall member 32, and the ends of the portions of the members 32 adjacent the sides of the window 34 are provided with vertical grooves 36 which receive opposed side edges of the window 34 so as to retain the window 34 in position.

The rear wall 16 is of identical construction to the front wall 14 and has a lowermost longer wall member 40, five shorter wall members 42, and window 44 with opposed side edges received in grooves 46 in the ends of the rear wall members 42 adjacent to the window 44.

The side wall 18 comprises a lowermost horizontal elongated wall member 48 of the same cross-section as before extending transversely across the floor 12 and projecting therefrom at the front and rear. The lower surface of the wall member 48 has a recess 50 in its bottom surface of the same length as the distance between the front and rear edges of the floor 12, and the upper surfaces of the floor members 22 have recesses 51. The recess 50 receives the floor members 22 and the recess 51 in each floor member 22 receives the wall member 48 so as to provide close fitting interlocking engagement as before. The upper surface of the wall member 48 has a recess 52 and the front wall member 30 has a corresponding recess 54 in its lower surface, with the side wall member 48 and the front wall member 30 being interlocked in close fitting engagement as before. Similarly, the upper surface of the side wall member 48 has a recess 53 adjacent its rear end and the wall member 40 has a recess 55 effecting close fitting interlocking engagement, the side wall member 48 and rear wall member 40 thereby being interlocked in close fitting engagement.

The side wall 18 also comprises five further elongated wall members 56 of the same cross-section and length as the lowermost side wall member 48 and stacked one above the other. Each side wall member 56 is interlocked in close fitting engagement with the adjacent upper and lower front wall member 30 or 32. For this purpose, each side wall member 56 has a recess 58 in its lower surface interlocking in a recess 60 in the upper portion of the front wall member 30 or 32 in close fitting engagement and a recess 62 in its upper surface interlocking in a recess 64 in the lower portion of the front wall member 32 in close fitting engagement. Central portions of the four uppermost side wall members 56 are removed to receive a rectangular window 66 whose opposed side edges are received in grooves 68 in the wall members 56. The central portion of the lowest side wall member 56 is removed to provide an opening 70.

The front wall 14 also has four short elongated members 72 with the same cross-section as before passing through the front wall 14 adjacent to but spaced from the window 34. Each short member 72 is interlocked in close fitting engagement with the front wall member 32 above and below in the same manner as has been previously described. Similarly, the side wall 18 has five short elongated members 74 of the same cross-section as before passing through the side wall 18 adjacent to but spaced from the window 66 and opening 70. Each short member 74 is interlocked in close fitting engagement with the side wall members 48 or 56 above and below in the same manner as before. The short elongated members 72 and 74 strengthen portions of the front wall 14 and side wall 18 adjacent the windows 34 and 66 respectively.

The side walls 18, 20 also each have a triangular upper portion 76 with a longer elongated wall member 78 of the same cross-section as before located on top of the uppermost side wall member 56 and projecting forwardly and rearwardly therefrom. The lowermost portion of the longer wall member 78 is interlocked in close fitting engagement in the same manner as previously described with the upper portion of the front and rear wall members 32. Each triangular upper wall portion 76 also has elongated wall members 80 of upright rectangular section stacked one upon the other. The lengths of the wall members 80 decrease with increasing height to provide the triangular configuration of the upper wall portion 76, with the ends 82 of the wall members 80 being inclined to follow the triangular outline.

The rear wall 16 is constructed in the same manner as the front wall 14 and the side wall 20 is constructed in the same manner as the side wall 18. The walls are interlocked at the corners in close fitting engagement in the same manner as has been described for the corners formed by the front wall 14 and side wall 18.

The bird feeder 10 also has a roof 84 with a first roof portion 86 which slopes upwardly and rearwardly from the front wall 14 and a second roof portion 88 which slopes upwardly and rearwardly from the rear wall 16. Each roof portion 86, 88 comprises transversely-extending elongated roof members 90 of the same square cross-section as before located one above the other in stepped formation and interlocked in close fitting engagement with the floor members 78, 80 in the same manner as previously described. It will be noted that the uppermost roof member 90 forms an apex and is common to both roof portions 86, 88. For reinforcement and appearance purposes, a further elongated roof member 92 is provided rearwardly of the lowermost roof member 90 at the front and forwardly of the lowermost roof member 90 at the rear.

The foregoing description has explained how the various elongated members are interlocked in close fitting engagement. The retaining assembly 94 for retaining the elongated members in position will now be described.

The retaining assembly 94 comprises a shaft member 96 extending through the apex of the roof 84, through the interior of the bird feeder 10 and through the floor 12. The shaft member 96 is formed by four juxtaposed elongated members 98 of the same square cross section as before to provide a front pair and a rear pair of elongated members 98. Adjacent the upper end, the facing surfaces of the front and rear pairs of elongated members 98 have recesses forming a transversely extending aperture 100 which the uppermost roof member 90 passes, the aperture 100 being of slightly greater vertical extent than the height of the roof member 90.

Adjacent the lower end, where the shaft member 96 passes through the floor 12, the front and rear faces of the front pair and the rear pair of elongated members 98 have recess 102 of greater vertical extent than the vertical thickness of the floor 12. The central floor member 28 has recesses 104 on opposite sides, and the facing surfaces of adjacent floor members 28 have recesses 106 co-operating therewith, the grooved portions of the central elongated member 98 being interlocked therewith but being capable of vertical movement relative to the floor 12, such vertical movement being limited by the upper and lower ends of the recess 102 in the elongated members 98. Also, the facing surfaces of the front pair and the facing surfaces of the rear pair of elongated members 98 have longer grooves and co-operate to form an aperture 107 extending through the lower portion of the grooved parts of the elongated members 98 and the adjacent ungrooved parts thereof.

The retaining assembly 94 also includes a pair of wedge members 108, 110 which are located in the aperture 107 between the floor retainer member 24 and the lower end of the aperture 107. When fully assembled, the wedge members 108, 110 in aperture 107 of the central shaft member 96 pull the shaft member 96 downwardly to cause the upper end of the aperture 100 to bear on the roof member 90 which passes therethrough, and the resulting compression forces transmitted from the roof member 90 through the various roof, wall and floor members to the transverse member 24 retain the various parts in assembly. The opposite ends of the floor 12 are stabilized by elongated stabilizer members 112, 114 of the same square cross-section as before and with outer ends interlocked in close fitting engagement in the same manner as previously described with the lower elongated member 30 of the front and rear walls 14, 16 (as shown in the cutaway portion of rig. 1).

To dissemble the miniature building, it is simply necessary to remove the wedge members 108, 110. The apex roof member 90 can then be removed from the shaft assembly 96 and the remaining parts removed from the top downwards. Assembly is of course the reverse procedure.

The described embodiment is a bird feeder 10. The front roof portion 86 has an aperture 116 formed by recesses in two adjacent roof members 90 to enable bird seed to be put into the bird feeder. A rain shield 118 is provided under the roof 86 to prevent rain from entering the bird feeder, the shield 118 having an aperture 120, aligned with the aperture 116. The shield 118 has a slidable closure 122 which in the position shown in FIG. 3 closes the aperture 120, but which can be moved to the open position shown in dotted outline in FIG. 3 when it is desired to put bird seed into the feeder. Birds can perch on the reinforcing members 112, 114 or on adjacent portions of the floor 12 and can obtain feed through the aperture 70 below the windows 66. It will be noted that the elongated floor members 20 and elongated roof members 90 extend parallel to one another, beyond the side walls 18, 20 for at least one-sixth of their length at each end for this purpose.

The attractive appearance and ease of the assembly and disassembly of the bird feeder will be readily apparent to a person skilled in the art, as will also the simple nature of the described parts and consequent inexpensive nature of the construction.

Other embodiments of the invention, such as modifications of the described bird feeder or embodiments forming bird houses or children's toys will also be readily apparent to a person skilled in the art, the scope of the invention being defined in the appended claims.

I claim:

1. A miniature building having a floor comprising a series of horizontal side-by-side floor members, walls mounted on the floor, said walls surrounding an area and forming corners where pairs of adjacent walls meet, each wall comprising a series of horizontal elongated walls members stacked one upon the other, the wall members of each wall being interlocked with adjacent wall members of an adjacent wall at each corner formed by a pair of adjacent walls, a pair of opposed walls having upper portions extending above at least one other wall, a roof mounted on the upper portion of said pair of opposed walls, said roof comprising a series of horizontal elongated roof members located one above the other in stepped formation, said wall members of said upper wall portions being interlocked with the elongated roof members, said upper wall portions extending above a further pair of opposed walls, said roof comprising a first roof portion with elongated roof members in stepped formation extending upwardly from the one of said further opposed walls and a second roof portion with elongated members in stepped formation extending upwardly from the other of said further opposed walls, said roof portions meeting at an apex, said building also including a retaining assembly retaining the elongated members of the roof, walls and floor in position, said retaining assembly comprising a shaft member extending from the apex of the roof centrally through the building and through the floor, said shaft member protruding from the roof, a first releasable retaining member passing through an upper aperture in the shaft member to service as an upper retaining member, and a second elongated retaining member extending transversely of and below the elongated floor members and passing through a lower aperture in the shaft member to serve as a lower retaining member.

2. A miniature building according to claim 1 wherein said elongated floor members and said elongated roof members extend parallel to each other beyond the said opposed side walls for at least one-sixth of their length at each end.

3. A miniature building according to claim 1 wherein the elongated wall members and the elongated roof members have downwardly and upwardly open recesses to enable adjacent wall members or wall members and roof members to be interlocked with each other.

4. A miniature building according to claim 1 wherein the shaft member comprises four juxtaposed elongated members, the upper retaining member comprises an uppermost roof member passing through upper recesses in the elongated shaft members which form an upper aperture of slightly greater vertical extent than the height of the uppermost roof member and the lower retaining member comprises an elongated floor support retainer member extending transversely to the floor members through lower recesses in the elongated shaft members forming a lower aperture below the floor, and at least one wedge member passing through the lower aperture between the floor support retainer member and a lower end of the lower aperture, said floor members and said elongated shaft members having cooperating recesses enabling the shaft member to move vertically relative to the floor members to enable the wedge member or members to cause the shaft member to bear on the uppermost roof member such that the resultant compression forces transmitted from the upper roof member through the roof, wall and floor members to the elongated floor support retainer member retain the building in assembled condition.

* * * * *